United States Patent
Breu et al.

(10) Patent No.: US 11,794,583 B2
(45) Date of Patent: Oct. 24, 2023

(54) DRIVE DEVICE FOR A MOTOR VEHICLE AND METHOD FOR OPERATING A DRIVE DEVICE FOR A MOTOR VEHICLE

(71) Applicant: AUDI AG, Ingolstadt (DE)

(72) Inventors: Martin Breu, Heilsbronn (DE); Maximilian Schiedermeier, Ingolstadt (DE)

(73) Assignee: Audi AG, Ingolstadt (DE)

( * ) Notice: Subject to any disclaimer, the term of this patent is extended or adjusted under 35 U.S.C. 154(b) by 792 days.

(21) Appl. No.: 16/115,418

(22) Filed: Aug. 28, 2018

(65) Prior Publication Data

US 2019/0061556 A1  Feb. 28, 2019

(30) Foreign Application Priority Data

Aug. 28, 2017 (DE) ...................... 10 2017 214 972.8

(51) Int. Cl.
*B60L 1/00* (2006.01)
*B60L 50/60* (2019.01)
(Continued)

(52) U.S. Cl.
CPC .................. *B60L 1/00* (2013.01); *B60L 50/64* (2019.02); *B60L 50/66* (2019.02); *B60L 50/71* (2019.02);
(Continued)

(58) Field of Classification Search
CPC ....................................................... B60L 1/00
(Continued)

(56) References Cited

U.S. PATENT DOCUMENTS 6,255,008 B1 * 7/2001 Iwase ...................... B60L 58/30
429/9
8,373,381 B2 * 2/2013 Raiser ...................... H02J 7/34
320/101

(Continued)

FOREIGN PATENT DOCUMENTS

DE  10 2004 004 623 A1  9/2005
DE  11 2006 000 895 T5  5/2008
(Continued)

OTHER PUBLICATIONS

Chinese Office Action, dated Nov. 29, 2021, for Chinese Application No. 201810981549.1, 7 pages.

*Primary Examiner* — Adi Amrany
(74) *Attorney, Agent, or Firm* — Seed IP Law Group LLP

(57) ABSTRACT

The disclosure relates to a drive device for a motor vehicle, with a primary power network and a secondary power network, wherein a fuel-cell device is provided in the primary power network, and a battery is provided in the secondary power network, and a drive unit of the drive device is electrically connected to the secondary power network, and wherein the battery provides, within an operating voltage range delimited downwards by a minimum voltage and upwards by a maximum voltage, electric current for proper operation of at least one electrical consumer over an operating current range delimited downwards by a minimum amperage and delimited upwards by a maximum amperage. It is provided in this respect that an open-circuit voltage of the fuel-cell device correspond at most to the maximum voltage, and that the fuel-cell voltage provided by the fuel-cell device across the operating current range be higher than the minimum voltage. The disclosure furthermore relates to a method for operating a drive device for a motor vehicle.

8 Claims, 1 Drawing Sheet

(51) Int. Cl.
  *B60L 50/71* (2019.01)
  *B60L 50/72* (2019.01)
  *B60L 58/21* (2019.01)
  *B60L 58/40* (2019.01)
  *B60L 50/75* (2019.01)
  *B60L 50/64* (2019.01)

(52) U.S. Cl.
  CPC ............ *B60L 50/72* (2019.02); *B60L 50/75* (2019.02); *B60L 58/21* (2019.02); *B60L 58/40* (2019.02); *B60L 2240/547* (2013.01); *B60L 2240/549* (2013.01)

(58) Field of Classification Search
  USPC ........................................................ 307/10.1
  See application file for complete search history.

(56) References Cited

U.S. PATENT DOCUMENTS

| | | | |
|---|---|---|---|
| 2003/0118876 A1* | 6/2003 | Sugiura | H01M 16/006 429/9 |
| 2004/0076860 A1* | 4/2004 | Aso | B60L 58/31 429/430 |
| 2006/0166045 A1* | 7/2006 | Ryoichi | H01M 8/04302 429/9 |
| 2006/0238033 A1 | 10/2006 | Raiser et al. | |
| 2007/0092763 A1* | 4/2007 | Ouchi | H01M 16/006 429/9 |
| 2008/0042615 A1 | 2/2008 | Serrels et al. | |
| 2008/0308329 A1* | 12/2008 | Saeki | H01M 8/04753 180/65.31 |
| 2009/0284080 A1* | 11/2009 | Kojima | H02M 3/157 307/85 |
| 2010/0089672 A1* | 4/2010 | Lee | H01M 8/04228 180/65.275 |
| 2011/0001453 A1* | 1/2011 | Goto | H01M 16/006 320/101 |
| 2012/0019190 A1* | 1/2012 | Jones | H01M 10/46 320/101 |
| 2012/0053766 A1* | 3/2012 | Ham | B60L 58/31 701/22 |
| 2016/0137074 A1* | 5/2016 | Schimanek | B60L 8/003 307/10.1 |
| 2016/0141896 A1* | 5/2016 | Brandon | H01M 10/425 307/72 |
| 2016/0185252 A1* | 6/2016 | Kwon | B60L 11/1881 307/10.1 |
| 2016/0272086 A1* | 9/2016 | Kazuno | H01M 8/04917 |
| 2019/0322183 A1* | 10/2019 | Breu | B60L 50/75 |

FOREIGN PATENT DOCUMENTS

| | | |
|---|---|---|
| DE | 10 2009 046 305 A1 | 5/2011 |
| DE | 10 2015 013 062 A1 | 4/2017 |

\* cited by examiner

DRIVE DEVICE FOR A MOTOR VEHICLE AND METHOD FOR OPERATING A DRIVE DEVICE FOR A MOTOR VEHICLE

BRIEF SUMMARY

The disclosure relates to a drive device for a motor vehicle, with a primary power network and a secondary power network, wherein a fuel-cell device is provided in the primary power network, and a battery is provided in the secondary power network, and a drive unit of the drive device is electrically connected to the secondary power network, and wherein the battery provides, within an operating voltage range delimited downwards by a minimum voltage and upwards by a maximum voltage, electric current for proper operation of at least one electrical consumer over an operating current range delimited downwards by a minimum amperage and delimited upwards by a maximum amperage. The disclosure furthermore relates to a method for operating a drive device for a motor vehicle.

The drive device is used to drive the motor vehicle; to this extent, it thus provides a drive torque directed at driving the motor vehicle. For this purpose, the drive device comprises at least one drive unit, which is designed as an electric machine and can be provided with electrical energy via the primary power network and/or the secondary power network. Naturally, the drive device can be designed as a hybrid drive device and, in this respect, have, in addition to the drive unit, at least one further drive unit that is of a different type than the drive unit. The further drive unit is provided, for example, as a combustion engine or the like.

The primary power network and the secondary power network form an on-board network of the motor vehicle or constitute at least a portion of such an on-board network. The primary power network and the secondary power network are preferably operated at different voltage levels—for example, the primary power network at a first voltage, and the secondary power network at a second voltage. At least intermittently, the two voltages can be different from each other.

A first power source is provided in the primary power network, and a second power source is provided in the secondary power network, wherein the first power source is designed as a fuel-cell device, and the second power source is designed as a battery. The fuel-cell device can be provided in the form of a single fuel-cell or, alternatively, as a fuel-cell stack with several fuel-cells. The fuel-cell device serves to reliably supply electrical energy to the on-board network. The battery, on the other hand, is provided for intermediate storage of the energy—in particular, of energy that was provided by means of the fuel-cell device.

The drive unit of the drive device, i.e., the electric machine, is electrically connected to the secondary power network and, preferably, permanently electrically connected to the battery during driving operation of the motor vehicle. The connection of the drive unit to the secondary power network can, for example, be realized via an inverter—in particular, a pulse inverter.

It is the aim of the disclosure to propose a drive application for a motor vehicle, which application has advantages compared to known drive devices—in particular, is built more easily and more cost-effectively and still reliably covers all operating ranges.

This is achieved according to the disclosure by a drive device for a motor vehicle with the features of claim 1. It is provided in this respect that an open-circuit voltage of the fuel-cell device correspond at most to the maximum voltage, and that the fuel-cell voltage provided by the fuel-cell device across the operating current range be higher than the minimum voltage.

In other words, a coordination of the fuel-cell device and the battery is provided such that their voltage-current characteristic curves or current-voltage characteristic curves at least partially correspond, viz., with respect to the open-circuit voltage and the maximum voltage, on the one hand, and the fuel-cell voltage and the minimum voltage on the other. The minimum voltage and the maximum voltage correspond to those voltages that can be provided by the battery within the operating current range.

A voltage-current characteristic map, which contains the voltage-current characteristic curves for all possible loading points of the battery, can be created for the battery. Across each of the characteristic curves, the battery is to be able to provide electric current for proper operation of the at least one electrical consumer. This applies, in particular, also in the case of the maximum amperage. At this amperage, therefore, a drop in the voltage provided by the battery shall not occur. Rather, the voltage shall continue to be sufficient to operate the consumer properly, i.e., the drive unit of the drive device, for example.

The characteristic map is delimited, with respect to the voltage, downwards by the minimum voltage and upwards by the maximum voltage, which define to this extent the operating voltage range of the battery within which the voltage is high enough for proper operation of the consumer—in particular, the drive unit. Within the operating current range that is delimited downwards by the minimum amperage and upwards by the maximum amperage, the battery delivers a voltage within the operating voltage range. The minimum amperage is preferably equal to zero, whereas the maximum amperage is the highest amperage occurring during proper operation of the at least one electrical consumer. The maximum amperage is in this respect precisely not a short-circuit amperage, but is limited to the amperage occurring during proper operation of the drive device.

Within the storage-current characteristic map of the battery, the voltage-current characteristic curves of the battery have a voltage that decreases with increasing amperage for different charge levels. The drop in the voltage with increasing amperage is in this case linear, or at least almost linear. To this end, the operating current range is preferably selected accordingly. For example, the operating current range is defined such that the voltage of the battery decreases, starting from the minimum amperage up to the maximum amperage, by at most 30%, at most 25%, at most 20%, at most 15%, at most 10%, or at most 5%.

The fuel-cell device and the battery are now to be adapted to each other such that the voltage provided by the fuel-cell device conforms to the voltage-current characteristic map of the battery. To this end, the open-circuit voltage of the fuel-cell device is, for one thing, to correspond at most to the maximum voltage. The open-circuit voltage of the fuel-cell device is particularly preferably equal to the maximum voltage, i.e., the voltage provided by the battery at maximum charge level. At the same time, the voltage provided by the fuel-cell device, which can also be called fuel-cell voltage, across the entire operating current range, i.e., starting from the minimum amperage up to the maximum amperage, is to be higher than the minimum voltage, so that the fuel-cell device also always makes possible proper operation of the at least one electrical consumer, independently of the charge level of the battery.

Such a coordination of the fuel-cell device and the battery with each other makes possible extremely efficient operation of the on-board network—in particular, of a DC-DC converter (if provided)—via which the secondary power network is connected to the primary power network. Particularly preferably, the primary power network and the secondary power network are, however, electrically connected to each other without such a DC-DC converter—in particular, permanently. In such an embodiment, the connection of the primary power network and the secondary power network to each other is in this respect designed without a converter or without a DC-DC converter. This makes possible not only extremely efficient operation of the on-board network, but also a very simple and cost-effective structure, because the DC-DC converter is dispensed with.

Within the framework of another embodiment of the disclosure, it is provided that the primary power network have a first primary power network connection and a second primary power network connection, and the secondary power network have a first secondary power network connection and a second secondary power network connection, wherein the first primary power network connection and the first secondary power network connection are connected to each other via a blocking diode, and the second primary power network connection and the second secondary power network connection are connected directly to each other. Each of the two power networks has in this respect two power network connections, via which the power networks are ultimately electrically connected to each other.

The second primary power network connection and the second secondary power network connection are electrically connected to each other directly and, preferably, permanently and are, in particular, connected to the electrical ground—preferably, also permanently. The same electrical potential is in this respect provided at the second primary power network connection and the second secondary power network connection. On the other hand, the first primary power network connection and the first secondary power network connection are only indirectly connected to each other via the blocking diode. The advantages of such a circuit of the on-board network or of the two power networks have already been pointed out above.

Another embodiment of the disclosure provides that the blocking diode have its forward direction from the primary power network in the direction of the secondary power network. Accordingly, electrical energy can pass from the primary power network into the secondary power network when the voltage in the primary power network is high enough. The opposite transmission direction is, however, excluded. Applying an impermissibly high voltage to the primary power network is thus reliably avoided.

A particularly preferred further embodiment of the disclosure provides that the primary power network be electrically connected to the secondary power network without a voltage converter. This was already addressed above. The secondary power network is preferably connected to the primary power network only via the blocking diode. To this end, the first primary power network connection is connected to the first secondary power network connection via the blocking diode, whereas the second primary power network connection and the second secondary power network connection are directly connected to each other. This makes possible a particularly simply and cost-effectively structured design of the on-board network and of the drive device, which moreover makes possible extremely efficient operation without conversion losses.

A development of the disclosure provides that the battery have a certain number of battery cells and/or the fuel-cell device have a certain number of fuel-cells, wherein the number of battery cells and/or the number of fuel-cells is selected such that the open-circuit voltage of the fuel-cell device corresponds to the maximum voltage. The coordination of the voltage-current characteristic curves of the fuel-cell device and the battery takes place in this respect preferably via the number of battery cells and the number of fuel-cells. Additionally or alternatively, different types of battery cells, e.g., with different nominal voltages, can be used to adapt the battery to the fuel-cell device.

The coordination takes place in this case predominantly such that the open-circuit voltage of the fuel-cell device corresponds to the maximum voltage. Furthermore, it is ensured, by appropriately selecting the operating current range and/or, in turn, by selecting the number of battery cells and/or the number of fuel-cells or the type of battery cells, that the fuel-cell voltage provided by the fuel-cell device across the operating current range is higher than the minimum voltage. The coordination of the fuel-cell device and of the battery to each other takes place in this respect solely by easy-to-implement measures in the design of the fuel-cell device and of the battery.

A development of the disclosure provides that, with increasing amperage, a voltage-current characteristic curve of the fuel-cell device asymptotically approximate a voltage-current characteristic curve of the battery. At the beginning, the requirement was expressed that the fuel-cell voltage across the operating current range is to be higher than the minimum voltage of the battery. This is to be realized by the asymptotic approximation of the characteristic curves of the fuel-cell device and battery. The voltage-current characteristic curve of the battery decreases with increasing amperage—in particular, linearly. The characteristic curve corresponds in this respect to a straight line or at least to an almost straight line.

The voltage-current characteristic curve of the fuel-cell device, on the other hand, changes considerably across the operating current range. In particular, at low amperages, it drops significantly with increasing amperage, whereas the decrease in the voltage, with increasing amperage, is less at higher amperages. In other words, with increasing amperage, the gradient of the voltage decreases over the amperage. This is exploited in order to be able to implement the particularly efficient operation of the drive device, even at high amperages. To this end, the fuel-cell device and the battery are adapted to each other such that, with increasing amperage, their voltage-current characteristic curves approximate each other. The characteristic curve of the battery is preferably a characteristic curve of the battery at minimum charge level, for which the voltage provided by the battery over the entire operating current range is, however, sufficient for proper operation of the at least one electrical consumer.

Another preferred embodiment of the disclosure provides that the voltage-current characteristic curve of the battery be provided at a minimum charge level of the battery, at which the battery provides, across the operating current range, a voltage corresponding to at least the minimum voltage. This has already been addressed above. Even at the minimum charge level of the battery, a voltage sufficient for proper operation of the consumer is realized across the entire operating current range. This means that the consumer could also be supplied solely by means of the battery at the minimum charge level, at least over a short time period. Using the minimum charge level of the battery has the advantage that the advantageous coordination between the fuel-cell device and battery is provided across all operating ranges of the drive device.

A further embodiment of the disclosure provides that the electric current required for operating the consumer be provided by means of the fuel-cell device and the battery in proportions that depend upon a currently required electric power of the consumer. The electric current used to operate the consumer can be supplied either solely by the fuel-cell, solely by the battery, or in different proportions by both. In this respect, the proportions can basically be arbitrary. They thus comprise the states in which the current is provided solely by means of the fuel-cell or solely by means of the battery. In other words, each of the proportions is between 0% and 100% of the required electric current or of the required electric power.

In which proportions the current is provided by the fuel-cell and the battery depends upon the currently required electric power of the consumer and the charge level of the battery. The higher the charge level is, the larger the proportion of the electric current provided by the battery. With decreasing charge level, the fuel-cell device will contribute an increasing proportion in order to supply current to the consumer. The distribution of the current supply to the fuel-cell device and the battery results automatically in the case of the particularly simple design of the drive device, in which the primary power network and the secondary power network are electrically connected to each other solely via the blocking diode. No additional control and/or adjustment is, in this respect, necessary.

Lastly, it can be provided, within the framework of another preferred embodiment of the disclosure, that all battery cells and/or all fuel-cells always be electrically connected to the power network when an electrical connection between the fuel-cell arrangement or the battery to the respective power network is present. It is thus not provided to electrically connect only a portion of the battery cells or a portion of the fuel-cells to the power network. If a connection of the fuel-cell arrangement or of the battery and the respective power network is provided, all battery cells and all fuel-cells are always electrically connected to these. This also contributes to as simple a design of the drive device as possible, viz., because no switching devices are provided for connecting only individual battery cells or fuel-cells to the respective power network.

The disclosure furthermore relates to method for operating a drive device for a motor vehicle—in particular, a drive device according to the preceding embodiments, wherein the drive device has a primary power network and a secondary power network, wherein a fuel-cell device is provided in the primary power network, and a battery is provided in the secondary power network, and a drive unit of the drive device is electrically connected to the secondary power network, and wherein the battery provides, within an operating voltage range delimited downwards by a minimum voltage and upwards by a maximum voltage, electric current for proper operation of at least one electrical consumer over an operating current range delimited downwards by a minimum amperage and delimited upwards by a maximum amperage. It is provided in this respect that an open-circuit voltage of the fuel-cell device correspond at most to the maximum voltage and that the fuel-cell voltage provided by the fuel-cell device across the operating current range be higher than the minimum voltage.

The advantages of such a design of the drive device or such an approach have already been pointed out. Both the drive device and the method for operating it can, in accordance with the foregoing explanations, be further developed, which are accordingly referenced in this respect.

BRIEF DESCRIPTION OF THE SEVERAL VIEWS OF THE DRAWINGS

The disclosure is explained in more detail below with reference to the exemplary embodiments shown in the drawing, without any limitation of the disclosure ensuing. Shown are.

DETAILED DESCRIPTION

Figure 1:
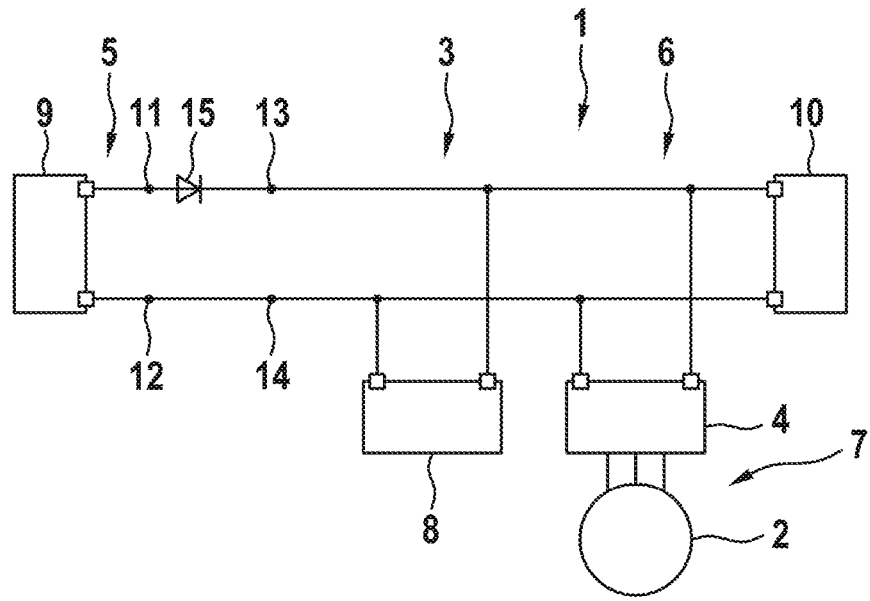
FIG. 1 shows a schematic illustration of a drive device of a motor vehicle with an on-board network having a primary power network and a secondary power network.

FIG. 1 shows a schematic illustration of a drive device 1 of a motor vehicle, wherein the drive device 1 has at least one drive unit 2, which is provided in the form of an electric machine. In order to supply the drive unit 2 with electric current, it is connected to an on-board network 3—in particular, via an inverter 4—which is preferably designed as a pulse inverter. The on-board network 3 has a primary power network 5 and a secondary power network 6, which are electrically connected to each other. The drive unit 2 is connected to the secondary power network 6 via the inverter 4. The drive unit 2 is in this respect provided as an electrical consumer 7. In addition to the consumer 7, at least one additional electrical consumer 8 can be provided, which is also connected to the secondary power network 6.

A first power source 9 is provided in the form of a fuel-cell device in the primary power network 5, and a second power source 10 is provided in the form of a battery in the secondary power network 6. The primary power network 5 has a first primary power network connection 11 and a second primary power network connection 12. The secondary power network 6, by contrast, has a first secondary power network connection 13 and a second secondary power network connection 14. The first primary power network connection 11 is connected to the first secondary power network connection 13 via a blocking diode 15. A forward direction of the blocking diode 15 is in this case provided in the direction from the primary power network 5 to the secondary power network 6. The second primary power network connection 12 is, by contrast, electrically connected directly to the second secondary power network connection 14.

This results in an extremely simple design of the drive device 1, because the primary power network 5 and the secondary power network 6 are electrically connected to each other without a converter or without a voltage converter. The electrical connection is realized solely via the blocking diode 15. In order to be able to make this possible in a particularly advantageous manner, the fuel-cell device 9 and the battery 10 are coordinated with each other.

Figure 2:
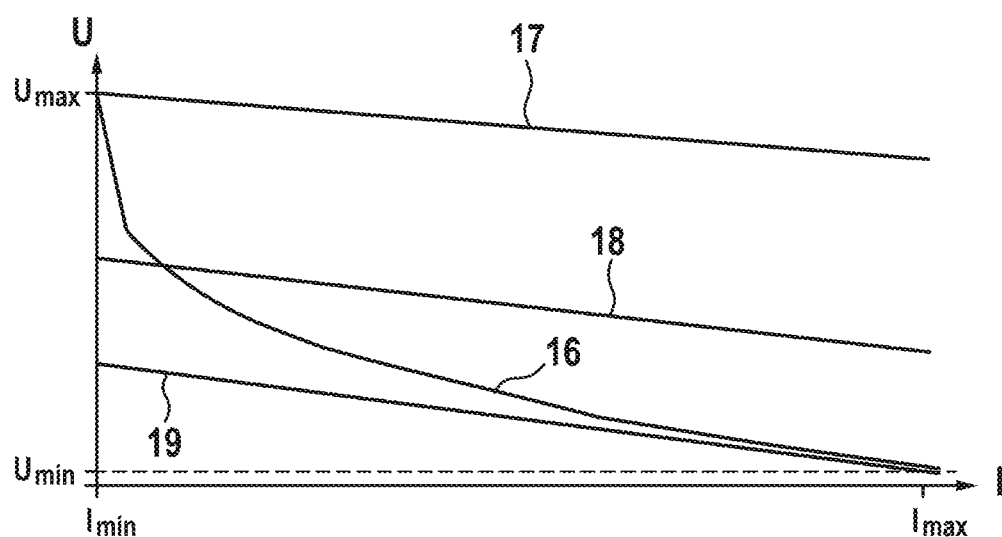
FIG. 2 shows a voltage-current characteristic map, in which the voltage-current characteristic curves for a battery of the on-board network for different charge levels and a voltage-current characteristic line of a fuel-cell device of the on-board network are plotted.

FIG. 2 shows a voltage-current characteristic map, in which a voltage-current characteristic curve 16 of the fuel-cell 9 and voltage-current characteristic curves 17, 18, and 19 for the battery 10 are plotted. The characteristic curves 17, 18, and 19 of the battery 10 differ with respect to their charge levels. A high charge level—in particular, a maximum charge level—is provided for characteristic curve 17, a medium charge level is provided for characteristic curve 18, and a low charge level—in particular, a minimum charge level—is provided for characteristic curve 19.

The characteristic map comprises an operating voltage range, on the one hand, and an operating current range on the other. The operating voltage range is delimited downwards by a minimum voltage $U_{min}$ and upwards by a maximum voltage $U_{max}$. The operating current range, on the other hand, is delimited downwards by a minimum amperage $I_{min}$ and upwards by a maximum amperage $I_{max}$. Within the operating current range, the voltage provided by the battery 10 is to always be sufficient to operate the at least one consumer 7 or 8 properly. Within the operating current range, a corresponding minimum voltage $U_{min}$ is thus always provided.

It can be seen clearly that the characteristic curve 16 of the fuel-cell 9 is coordinated with the operating voltage range and the operating current range. An open-circuit voltage of the fuel-cell device 9, in particular, corresponds at most to the maximum voltage—in particular, corresponds precisely to the maximum voltage. Vice versa, the fuel-cell voltage provided by the fuel-cell device 9 across the operating current range is always higher than the minimum voltage $U_{min}$. The fuel-cell voltage, in particular, asymptotically approximates the characteristic curve 19 for the lowest charge level illustrated here. With such a design, very efficient operation of the drive device 1 can be ensured, and, for another thing, the drive device 1 can be designed very simply so that installation space and cost advantages result.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A drive device for a motor vehicle, with a primary power network and a secondary power network, wherein a fuel-cell device is provided in the primary power network, the fuel-cell device comprising a certain number of fuel cells, and a battery is provided in the secondary power network, the battery comprising a certain number of battery cells, and a drive unit of the drive device is electrically connected to the secondary power network, and wherein the number of fuel cells of the fuel-cell device and the number of battery cells of the battery are selected in coordination such that, within an operating voltage range delimited downwards by a minimum operating voltage and upwards by a maximum operating voltage, the battery provides electric current for proper operation of at least one electrical consumer across an operating current range delimited downwards by a minimum amperage and upwards by a maximum amperage, wherein an open-circuit voltage of the fuel-cell device corresponds at most to the maximum operating voltage of the battery, and the fuel-cell voltage provided by the fuel-cell device across the operating current range is higher than the minimum operating voltage of the battery, wherein the minimum operating voltage of the battery is the voltage of the battery when the battery is charged to a minimum charge level and the electric current is at the maximum amperage of the operating current range, and the maximum operating voltage of the battery is the voltage of the battery when the battery is charged to a maximum charge level and the electric current is at the minimum amperage of the operating current range.

2. The drive device according to claim 1, wherein the primary power network has a first primary power network connection and a second primary power network connection, and the secondary power network has a first secondary power network connection and a second secondary power network connection, wherein the first primary power network connection and the first secondary power network connection are connected to each other via a blocking diode, and the second primary power network connection and the second secondary power network connection are connected directly to each other.

3. The drive device according to claim 2, wherein the blocking diode has its forward direction from the primary power network in the direction of the secondary power network.

4. The drive device according to claim 1, wherein the primary power network is electrically connected to the secondary power network without a voltage converter.

5. The drive device according to claim 1, wherein the number of fuel cells of the fuel-cell device and the number of battery cells of the battery are selected in coordination such that, with increasing amperage, a voltage-current characteristic curve of the fuel-cell device asymptotically approximates a voltage-current characteristic curve of the battery when the battery is charged to the minimum charge level.

6. The drive device according to claim 1, wherein the electric current required for operating the at least one electrical consumer is provided by means of the fuel-cell device and the battery in proportions that depend upon a currently required electric power of the at least one electrical consumer.

7. The drive device according to claim 1, wherein when an electrical connection between the fuel-cell device and the primary power network is present, all fuel-cells of the fuel-cell device are always electrically connected to the primary power network, and when an electrical connection between the battery and the secondary power network is present, all battery cells of the battery are always electrically connected to the secondary power network.

8. A method of operating a drive device for a motor vehicle, the drive device comprising a primary power network and a secondary power network, wherein a fuel-cell device is provided in the primary power network, and a battery is provided in the secondary power network, and a drive unit of the drive device is electrically connected to the secondary power network, the method comprising:

selecting, in coordination, a number of fuel cells to be included in the fuel-cell device and a number or type of battery cells to be included in the battery device such that, within an operating voltage range delimited downwards by a minimum operating voltage and upwards by a maximum operating voltage, the battery is operative to provide electric current for proper operation of at least one electrical consumer over an operating current range delimited downwards by a minimum amperage and upwards by a maximum amperage, wherein an open-circuit voltage of the fuel-cell device corresponds at most to the maximum operating voltage of the battery, and the fuel-cell voltage provided by the fuel-cell device across the operating current range is higher than the minimum operating voltage of the battery, wherein the minimum operating voltage of the battery is the voltage of the battery when the battery is charged to a minimum charge level and the electric current is at the maximum amperage of the operating current range, and the maximum operating voltage of the battery is the voltage of the battery when the battery is charged to a maximum charge level and the electric current is at the minimum amperage of the operating current range; and providing, by the battery, electric current for proper operation of the at least one electrical consumer.

\* \* \* \* \*